(12) United States Patent
Cuddihy et al.

(10) Patent No.: US 7,836,225 B2
(45) Date of Patent: Nov. 16, 2010

(54) METHOD AND SYSTEM FOR IMPROVING THE EFFICIENCY AND ENSURING THE INTEGRITY OF A DATA TRANSFER

(75) Inventors: David J. Cuddihy, Hamburg, NY (US); Shawn C. Martin, Lockport, NY (US); Michael H. Miller, Middleport, NY (US); David A. Snell, Youngstown, NY (US)

(73) Assignee: Atto Technology, Inc., Getzville, NY (US)

( * ) Notice: Subject to any disclaimer, the term of this patent is extended or adjusted under 35 U.S.C. 154(b) by 249 days.

(21) Appl. No.: 11/709,948

(22) Filed: Feb. 23, 2007

(65) Prior Publication Data

US 2007/0174413 A1 Jul. 26, 2007

Related U.S. Application Data

(62) Division of application No. 10/113,888, filed on Mar. 29, 2002.

(51) Int. Cl.
*G06F 13/00* (2006.01)
(52) U.S. Cl. ............................ 710/33; 710/21
(58) Field of Classification Search .................... 710/33; 709/214
See application file for complete search history.

(56) References Cited

U.S. PATENT DOCUMENTS

| | | | | |
|---|---|---|---|---|
| 5,136,371 | A | * | 8/1992 | Savatier et al. .......... 375/240.05 |
| 5,475,860 | A | * | 12/1995 | Ellison et al. .................. 710/26 |
| 6,484,187 | B1 | | 11/2002 | Kern et al. |
| 6,836,830 | B1 | * | 12/2004 | Yamagami et al. .......... 711/162 |
| 2003/0123274 | A1 | | 7/2003 | Camble et al. |
| 2004/0177130 | A1 | * | 9/2004 | Chambliss et al. .......... 709/219 |
| 2005/0165868 | A1 | * | 7/2005 | Prakash ...................... 707/204 |

OTHER PUBLICATIONS

United States Patent and Trademark Office, File Wrapper for U.S. Appl. No. 10/133,888 (David Cuddihy et al.), from which this application claims priority, Mar. 29, 2002-Jun. 20, 2008, US.
United States Patent and Trademark Office, Office Action, Feb. 18, 2010, U.S. Appl. No. 10/113,888 (US).

* cited by examiner

*Primary Examiner*—Henry W Tsai
*Assistant Examiner*—John B Roche
(74) *Attorney, Agent, or Firm*—Phillips Lytle LLP

(57) ABSTRACT

The present invention provides an improved method and system of improving the efficiency, and ensuring the integrity, of a data transfer in a serverless backup, or third party copy, system having one or more physical storage devices. The present invention provides improvements to the processing of serverless copy, or EXTENDED COPY, commands, and transfers of data associated with such commands. These improvements increase the speed at which such commands are executed and completed, and increase the capabilities of copy managers in serverless backup systems. The improvements also make better use of the storage devices involved in the data backup process. The method broadly includes determining a desired manner of execution of segment descriptors, or instructions, as a function of components of those instructions. Other aspects of the invention allow for execution of data segments of any size, and validation of segment descriptors and target descriptors prior to data transfer.

2 Claims, 6 Drawing Sheets

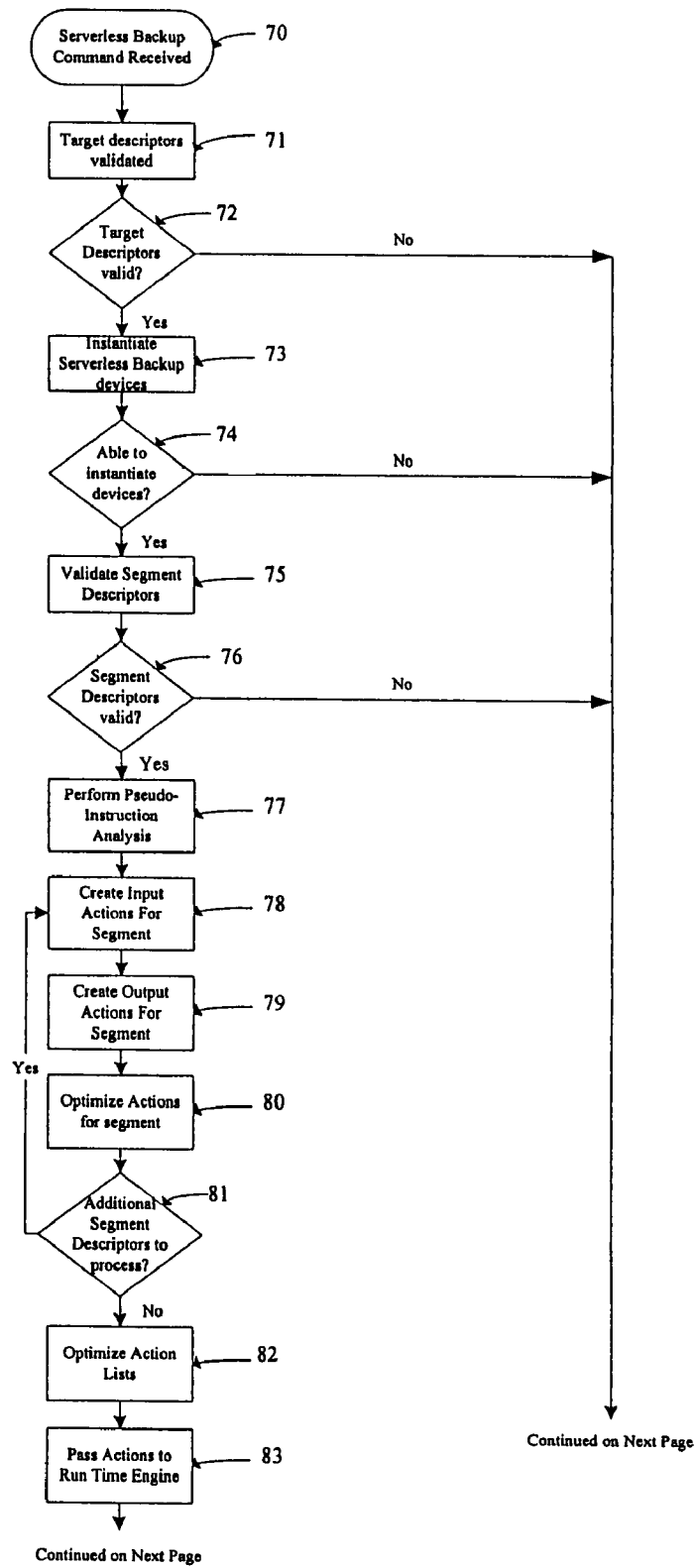
Fig. 4 (page 1 of 2)

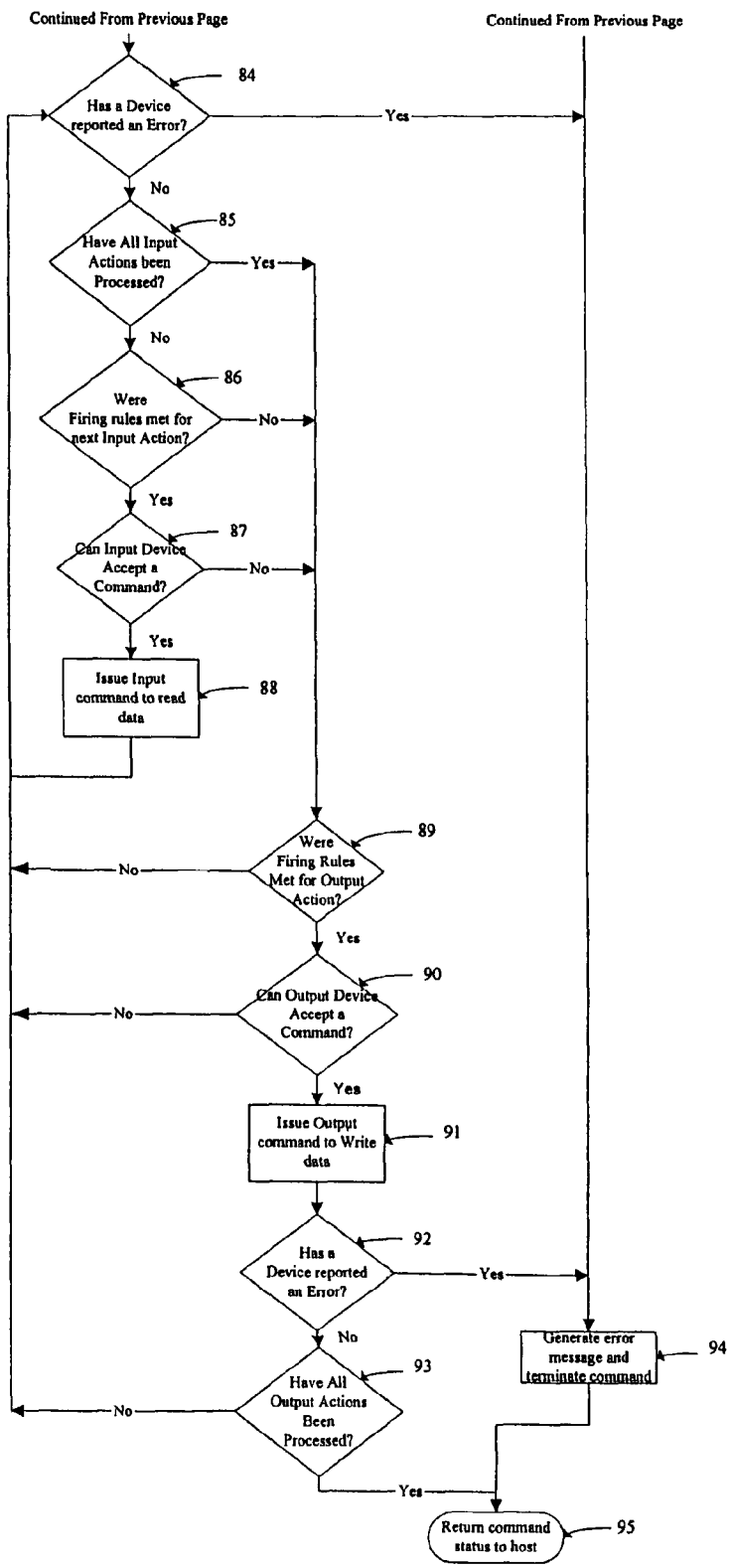
Fig. 4 (page 2 of 2)

METHOD AND SYSTEM FOR IMPROVING THE EFFICIENCY AND ENSURING THE INTEGRITY OF A DATA TRANSFER

RELATED APPLICATIONS

The present application is a divisional of co-pending U.S. patent application Ser. No. 10/113,888, filed Mar. 29, 2002, which is herein incorporated by reference.

TECHNICAL FIELD

The present invention relates generally to computer systems, and, more particularly, to data backup in storage area network ("SAN") environments.

BACKGROUND OF THE INVENTION

Computer systems and networks require backup and archival of data as part of their regular maintenance and security. To address a need for data backups in computer systems and networks using fewer server and local area network ("LAN") resources, the concept of serverless backup was devised. Serverless backup is also commonly referred to as "third party copy." This technology is widely known within the computer storage industry, and is detailed in specification T10/99-143r1 ("T10") and, more recently, in SCSI Primary Commands-3 ("SPC-3"), which specifications are incorporated herein by reference.

In a traditional LAN free backup, computer data is backed up using a SAN. While this frees the associated LAN from the data traffic occasioned by the backup, it still burdens one of the servers on the SAN with copying data from various storage devices to various backup storage devices. An example of a traditional LAN free backup is illustrated in FIG. 1. FIG. 1 depicts three servers (11, 12, 13) connected to a series of physical storage devices (15, 16, 17, 19, 20) through a generic SAN interconnect topology (10) and a storage router (18). The storage devices in this example are SCSI tape drives (16, 17) and disk arrays (15), and Fibre Channel tape drives (20) and disk arrays (19). An associated LAN is also depicted (14). FIG. 1 also illustrates the flow of commands (21, 23, 25) and data (22, 24, 25) to and from such physical storage devices.

In serverless backup, a specialized copy manager, or data mover, handles all of the data movement, or transfers, associated with the data backup. Examples of such data transfers include block to stream, stream to block, block to block, inline to stream, etc., all of which are described in the T10 and/or SPC-3 specifications. Serverless backup removes servers from the data path during the backup process, thus enabling those servers to be utilized for tasks other than backing up data. In a serverless backup system, a server, commonly referred to as a "host" in the SAN context, creates and transfers a command, i.e. an EXTENDED COPY command, to a copy manager residing in the serverless backup system. The copy manager handles all data transfers associated with the backup, and reports status back to the host that issued the command. An example of a serverless backup system is illustrated in FIG. 2. Such systems are disclosed in the prior art.

In FIG. 2, the serverless backup system (40) is depicted as part of a SAN (30). As in FIG. 2, serverless backup systems are typically associated with one or more hosts (42, 43, 44). Hosts associated with serverless backup systems may run data backup software sold by any one, or a combination of, numerous vendors to generate serverless backup commands. Such hosts include a wide array of hardware and operating system platforms.

Serverless backup systems typically include, without limitation, one or more copy managers (50) that perform backups according to serverless backup commands, and one or more physical storage devices (46, 47, 48, 51, 52) that data is transferred to and/or from during the serverless backup process. The physical storage devices depicted in FIG. 2 are of the same variety as those depicted in FIG. 1, as described above. Likewise, FIG. 2 depicts a SAN interconnection topology (41) and the flow of commands (53, 55, 59) and data (54, 56, 59) to and from such physical storage devices.

The copy manager (50) in the example of FIG. 2 resides within a storage router (49) for illustrative purposes. In practice, a copy manager may reside in a broad spectrum of devices. These devices include, but are not limited to, storage routers, bridges, switches, hubs, and individual physical storage devices (e.g. tape drives, hard drives, disk arrays, CD drives, etc.). The main criteria for defining a copy manager is any device, with the exception of hosts, capable of processing a serverless backup command.

Storage devices associated with serverless backup commands may be divided into two broad categories: physical storage devices and virtual storage devices.

Physical storage devices are actual, hardware-based devices that are used to store data. Examples are the Fibre Channel (52) and SCSI (47,48) tape drives and hard disk arrays (46, 51) depicted in FIG. 2. Further examples of physical storage devices include individual disk drives, tape drives, CD drives, DVD drives, arrays of such devices, and others. Storage protocols, and related storage protocol commands, used in interfacing the physical storage devices vary based upon application. Some examples are SCSI, Fibre Channel, iSCSI, ATA, etc.

Unlike physical storage devices, virtual storage devices do not exist in any clearly visible form, but are instead conceptual components built into the copy manager. For serverless backup commands, some examples of virtual devices include the PAD, INLINE, EMBEDDED, and DISCARD devices or associated actions. These virtual storage devices enable special case processing that may be called for in connection with a given serverless backup command.

Both physical storage devices and virtual storage devices may act as the sources of data to be transferred in the context of a serverless backup command. In such a capacity, such storage devices are referred to herein as "source storage objects." In the example depicted in FIG. 2, both the SCSI and Fibre Channel disk arrays may act as source storage objects. Similarly, both physical storage devices and virtual storage devices may act as the destinations to which data is transferred in the context of a serverless backup command. In such a capacity, they are referred to herein as "destination storage objects." In the example of FIG. 2, the Fibre Channel tape drive (52) acts as a destination storage object.

A serverless backup command (57) consists of an identifier for a command along with associated parameters, or command flags. Such a command also contains a list of target descriptors which describe the storage devices (targets) to be acted upon in processing the command. A serverless backup, or EXTENDED COPY, command further contains a list of segment descriptors that describe the data movements to occur with relation to those targets. Segment descriptors can be viewed generally as instructions as to how to perform the desired backup with the relevant storage devices. Segment descriptors are referred to generically herein as "instructions." The components of such instructions include, among other things, the location of the data to be transferred, the storage devices involved, the size of the data to be transferred, and others, all of which are described in the T10 and SPC-3 specifications incorporated herein. In addition to target and segment descriptors, a command may contain inline data to be transferred as part of the backup process.

The basic structure of a serverless backup command may be depicted as follows:

---

COMMAND IDENTIFIER
COMMAND FLAGS
TARGET DESCRIPTOR LIST LENGTH
SEGMENT DESCRIPTOR LIST LENGTH
1ST TARGET DESCRIPTOR
* * *
NTH TARGET DESCRIPTOR
1ST SEGMENT DESCRIPTOR
* * *
NTH SEGMENT DESCRIPTOR
INLINE DATA

---

The detailed format of such serverless backup commands varies based upon specification, and are included in specifications T10 and SPC-3.

In existing serverless backup command processing, a copy manager moves or transfers data by processing each segment descriptor (describing the data transfer to be performed) in the order in which it is received, i.e. in a linear fashion. In doing so, the copy manager reads data from a source storage device and writes data to a destination storage device for an individual segment. A flow chart illustrating such an existing process is depicted in FIG. 3. Using this method to process the command (60, 61, 62, 63, 64, 65, 66), copy managers allocate internal resources as required for the particular instance of data movement (segment).

While such traditional command processing may reliably back up data, it is performed in a slow and cumbersome manner. Delays may result in not only the execution of a command, but also in the retrieval of data, because traditional methods do not organize and segment the segment descriptors or the corresponding data in a preferred manner. No effort is made in such existing systems to increase the efficiency of copy managers or storage devices performing the backup, i.e. transferring or moving data. A further limitation of traditional processing is that individual segment descriptors, and the corresponding data transfers, are limited by the size of physical memory within a copy manager.

Therefore, a need exists for a method to address these shortcomings and improve the efficiency and ensure the integrity of data transfers in serverless backup systems. The methods of this invention were devised to address this need.

DISCLOSURE OF THE INVENTION

With parenthetical reference to the corresponding elements or portions of the disclosed embodiment, merely for purposes of illustration and not by way of limitation, the present invention provides an improved method and system of improving the efficiency, and ensuring the integrity, of a data transfer in a serverless backup system (40) with one or more physical storage devices (e.g. 46, 47, 48, 51, 52) and being associated with a host (42, 43, 44).

The present invention provides several improvements to the processing of serverless copy commands, and the transfer of data associated with such commands. These improvements increase the speed at which serverless copy commands are executed and completed, and increase the capabilities of copy managers. The improvements also make better use of the storage devices involved in the data backup process.

The improved method broadly includes the following steps: transferring from a host to the serverless backup system a command comprising one or more instructions designating a transfer of data from at least one source storage object to at least one destination storage object; and determining a desired manner of execution of the instructions as a function of components of the instructions, e.g. location of the data to be transferred, the storage devices involved, and the size of the data to be transferred.

In one aspect of the invention, the command is an EXTENDED COPY command. In another aspect, the instructions are segment descriptors.

Another aspect of the invention includes, in addition to the foregoing steps, the following additional step: transferring a second command from the host to the serverless backup system prior to completing the determination of the desired manner of execution of the instructions. In another aspect of the invention, the method includes the additional step of executing the instructions in the manner determined.

Yet another aspect of the invention includes the step of transferring a second command from the host to the serverless backup system prior to beginning the execution of the instructions. In another aspect, a second command is transferred from the host to the serverless backup system prior to completing the execution of the instructions.

Another aspect of the invention includes the step of transmitting the status of the command to the host upon completion of the execution of the instructions.

In another aspect of the invention, execution of the instructions includes reading from at least one of the source storage objects designated by the instructions; and, in another aspect, execution includes writing to at least one of the destination storage objects designated by the instructions.

In another aspect of the invention, execution of the instructions includes the step of transferring the data designated by the instruction, in the manner determined by the method of the present invention, from at least one of the source storage objects designated by the instructions to at least one of the destination storage objects designated by the instructions.

Another aspect of the invention includes the step of determining whether the instructions are capable of being executed by the serverless backup system, i.e. validating the segment descriptors. In one aspect of the invention, that determination is made before any data associated with the command being processed is transferred from the source storage object or to the destination storage object.

Yet another aspect of the invention includes the steps of providing a predetermined set of instructions which are executable by the serverless backup system, and comparing the instructions transferred from the host with the predetermined set of instructions, to determine if the instructions transferred from the host are included in the predetermined set of instructions, i.e. are capable of being executed. In one aspect of the invention, this comparison is performed before any data is transferred from a source storage object or to a destination storage object. In other aspects of the invention, an error message is generated, and/or the command is terminated, if any of the instructions are not included in that predetermined set of instructions.

In one aspect of the present invention, the command includes a target descriptor portion, and the method includes the additional step of determining whether the target descriptor portion is capable of being processed by the serverless backup system, i.e. validating the target descriptors. In one aspect of the invention, that determination is made before any data is transferred. In other aspects of the invention, an error message is generated, and/or the command is terminated, if the target descriptor portion is not capable of being processed by the serverless backup system.

Another aspect of the invention includes the steps of determining whether each of the instructions transferred from the host to the serverless backup system, as part of a command, is capable of application to a corresponding source storage object, and transferring the data designated by the instructions if each of the instructions is capable of application to a corresponding source storage object, wherein that determination is made prior to transferring any data. Other aspects of the invention include the steps of generating an error message, and/or terminating the command, if any of the instructions is not capable of application to the corresponding source storage object.

Another aspect of the invention includes the steps of determining whether each of the instructions transferred from the host to the serverless backup system, as part of a command, is capable of application to a corresponding destination storage object, and transferring the data designated by the instructions if each of the instructions is capable of application to a corresponding destination storage object, wherein that determination is made prior to transferring any data. Other aspects of the invention include the steps of generating an error message, and/or terminating the command, if any of the instructions is not capable of application to the corresponding destination storage object.

One of the principal improvements of this invention which provides increased efficiency is the generation and use of lists of input and output actions, referred to herein as "input/output actions." The input/output action lists reflect data transfers to and from the copy manager in a manner distinct from the segment descriptors. The input action list contains the actions that involve reading data from various storage devices into the copy manager, and the output action list contains the actions that involve writing data or storage protocol commands from the copy manager. All input/output actions describe the location and quantity of data associated with the action and how the action is related to other actions to be executed by the copy manager.

These input/output actions describe the storage devices involved in the transfer (virtual and physical), the operation to be performed with such devices (e.g. read, write, etc.), the number of bytes involved in the transfer ("transfer size"), corresponding memory locations, data hazards associated with the input/output action, etc.

The contents and format of an input/output action include:

| OPERATION CODE | ACTION ITEM STATE |
| --- | --- |
| STORAGE DEVICE IDENTIFIER | |
| BYTE TRANSFER LENGTH | |
| COUNT (NUMBER OF BLOCKS, FILEMARKS, ETC.) | |
| LOGICAL BLOCK ADDRESS | |
| SOURCE BLOCK DEVICE BYTE OFFSET | |
| DESTINATION BLOCK DEVICE BYTE OFFSET | |
| INLINE DATA ADDRESS | |
| EMBEDDED DATA ADDRESS | |
| DATA POINTER | |
| PREVIOUS ACTION FOR STORAGE DEVICE | |
| NEXT ACTION FOR STORAGE DEVICE | |
| DATA AVAILABILITY COUNTER | |
| RELATED LOW INPUT/OUTPUT ACTION | |
| RELATED HIGH INPUT/OUTPUT ACTION | |
| RELATED SEGMENT NUMBER | |
| INPUT ACTION DATA HAZARD | |
| OUTPUT ACTION DATA HAZARD | |

The operation code field describes the function that must be performed to complete the input/output action. Example operation fields can be read, write, space, and verify commands. The action item state describes the phase of operation that the action is in. These states include, but are not limited to compilation, run-time engine, command issued, and complete. The storage device identifier indicates the particular storage device in the serverless backup system that this action refers to. The byte transfer length is derived from the segment descriptor used to create the input/output action, and specifies the number of bytes that this action will move into, or out of, the copy manager. The logical block address is used in conjunction with action items that refer to block based storage devices. In such cases, it is used to identify the location that data is to be read from or written to on those devices. Source block device offset allows for the data for an input action that is to be read from a source block device to be started from a location other than the start of a whole block. Similarly, destination block device offset allows for the data for an output action that is to be written to a destination block device to be started from a location other than the start of a whole block. The inline data address provides a means for the copy manager to track the location of the inline data to be used for the action in the copy manager's internal memory. In the same way, embedded data address supplies a means for the copy manager to track the location of the embedded data to be used for the action in the copy manager's internal memory. The data pointer field is used by the copy manager to monitor the location of the data associated with the command in the internal memory of the copy manager. In the case of input actions, this field controls where data returned from storage devices is held by the copy manager. For output actions, this field designates the location of the data to be written out to a storage device in completing the action. The previous and next action for storage device fields provide links to the closest input/output actions in the list that involve the same storage device. Using this field, it is possible to traverse all of the actions for a given storage device in a particular list. This enables optimizations that group the execution of actions for a storage device in a manner that exploits the operating characteristics of that device. The data availability counter field tracks the number of input actions associated with a particular output action. Using this field, it can easily be determined when all data associated with an output action has been read into the copy manager, thus clearing the way for the output action to write the data out. Finally, the input and output action data hazard fields check for data ordering constraints similar to those encountered in pipelined computer architectures. These elements allow for data hazards such as read after write (RAW) and write after read (WAR) to be tracked such that data coherency can be protected during the optimizations performed during compilation.

Generally, in the present invention, each segment descriptor is transferred into one or more input actions, and one or more output actions. Input actions describe the individual data movements that will take place between source storage objects and the copy manager. This can be thought of as the copy manager reading data associated with serverless backup into its internal memory. Output actions describe the individual data movements that will take place between destination storage objects and the copy manager. This can be thought of as the copy manager writing data associated with serverless backup from its internal memory.

In other words, another aspect of the present invention includes the step of generating a list of input/output actions as a function of the components of the instructions. In another aspect of the invention, the method includes the step of determining a desired manner of execution of the input/output actions as a function of the characteristics of the instructions and of the physical storage devices present in the serverless backup system. Another aspect of the invention includes executing the input/output actions in the manner so determined.

Other aspects of the invention include the steps of determining the desired manner of execution of the input/output actions as a function of a data location, transfer size and device identifier associated with a physical storage device and/or input/output action. In other aspects of the invention, the desired manner of execution of the input/output actions includes combining a plurality of the input/output actions, and/or reordering a plurality of the input/output actions.

In other aspects of the invention, one or more of the instructions transferred from the host to the serverless backup system do not direct a transfer of data to a physical storage device. Other aspects of the invention include the steps of providing a virtual storage device, and transferring from a physical storage device to the virtual storage device data corresponding to such an instruction which does not direct a transfer of data to a physical storage device. In one aspect of the invention, such a transfer includes the processing of a DISCARD action. In another aspect of the invention, the method includes the steps of providing a virtual storage device, and transferring from the virtual storage device to a physical storage device data corresponding to an instruction which does not direct a transfer of data from a physical storage device. In other aspects of the invention, such a transfer includes the processing of PAD, INLINE, or EMBEDDED actions.

Other aspects of the invention include the step of providing a run-time engine to evaluate the characteristics of the instructions and the physical storage devices present in the serverless backup system. In another aspect, the method of the present invention includes the step of issuing storage protocol commands. In yet another aspect, the run-time engine determines whether the data designated by the instructions is capable of being read from said source storage objects. In another aspect, the method comprises the step of issuing storage protocol commands corresponding to each of the input/output actions if that data is capable of being read from the source storage objects.

In another aspect of the present invention, the run-time engine determines whether the data designated by the instructions is capable of being written to the destination storage objects. In another aspect, the method comprises the step of issuing storage protocol commands corresponding to each of the input/output actions if that data is capable of being written to the destination storage objects.

In another aspect of the invention, the serverless backup system includes a memory pool, and the run-time engine determines whether sufficient memory has been allocated by the serverless backup system to perform each of the input/output actions. Another aspect of the invention includes the following additional step: requesting additional memory from the memory pool if sufficient memory is not allocated by the serverless backup system to perform each of the input/output actions.

In another aspect of the present invention, the run-time engine inquires whether each of the source storage objects designated by the instructions is capable of performing a corresponding input action. Another aspect of the invention includes the following additional step: issuing storage protocol commands corresponding to each of the input/output actions if each of the source storage objects designated by the instructions is capable of performing a corresponding input action.

In another aspect of the present invention, the run-time engine inquires whether each of the destination storage objects designated by the instructions is capable of performing a corresponding output action. Another aspect of the invention includes the following additional step: issuing storage protocol commands corresponding to each of the input/output actions if each of the destination storage objects designated by the instructions is capable of performing a corresponding output action.

In other aspects of the invention, the determination of the desired manner of execution of instructions is made concurrently for a plurality of commands.

Another aspect of the invention includes the step of providing a compiler. In another aspect, the compiler determines the desired manner of execution.

In other aspects of the invention, the method includes the following steps: transferring from the host to the serverless backup system a command comprising one or more instructions designating a transfer of data from at least one source storage object to at least one destination storage object; providing a predetermined set of instructions executable by the serverless backup system; comparing those instructions with the predetermined set of instructions to determine if the instructions are included in the predetermined set of instructions; and transferring the data designated by the instructions if each of the instructions is included in the predetermined set of instructions; wherein the comparison is performed prior to the transfer of the data. Other aspects of the present invention include the following steps: generating an error message, and/or terminating the command, if any of those instructions are not included in said predetermined set of instructions.

In other aspects of the invention, the method includes the following steps: transferring from the host to the serverless backup system a command comprising one or more instructions designating a transfer of data from at least one source storage object to at least one destination storage object; determining whether each of the instructions is capable of application to a corresponding source storage object; and transferring the data designated by the instructions if each of the instructions is capable of application to a corresponding source storage object; wherein such determination is made prior to transfer of the data. Other aspects of the present invention include the following steps: generating an error message, and/or terminating the command, if any of the instructions is not capable of application to a corresponding source storage object.

In other aspects of the invention, the method includes the following steps: transferring from the host to the serverless backup system a command comprising one or more instructions designating a transfer of data from at least one source storage object to at least one destination storage object; determining whether each of the instructions is capable of application to a corresponding destination storage object; transferring the data designated by the instructions if each of the instructions is capable of application to the corresponding destination storage object; wherein such determination is made prior to transfer of the data. Other aspects of the present invention include the following steps: generating an error message, and/or terminating the command, if any of the instructions is not capable of application to a corresponding destination storage object.

In other aspects of the invention, the method includes the following steps: transferring from the host to the serverless backup system a command comprising one or more instructions designating a transfer of data from at least one source storage object to at least one destination storage object; generating a list of input/output actions as a function of components of the instructions; and providing a run-time engine to evaluate the characteristics of the instructions and the physical storage devices present in the serverless backup system. Another aspect includes the following step: determining whether the data designated by the instructions is capable of being read from the source storage objects. Yet another aspect includes this step: issuing storage protocol commands corresponding to each of the input/output actions if that data is capable of being read from the source storage objects.

Another aspect includes the following step: determining whether the data designated by the instructions is capable of being written to the destination storage objects. Yet another aspect includes this step: issuing storage protocol commands corresponding to each of the input/output actions if the data is capable of being written to the destination storage objects.

In the course of executing the command, the serverless backup system may encounter instructions which designate the transfer of data of a size greater than the size of the physical memory available in the copy manager. One aspect of this invention permits the processing of data segments or portions of unlimited size. In this aspect, instructions larger than a predetermined size, i.e. base memory buffer size, are broken into smaller segment descriptors referred to herein as "pseudo-instructions" or "pseudo-segments."

More particularly, one aspect of the invention, a method of executing a command comprising one or more instructions designating a transfer of data from at least one source storage object to at least one destination storage object is provided, which method includes the following steps: transferring from the host to the serverless backup system a command comprising an instruction, which instruction corresponds to data in a source storage object; comparing the base memory buffer size of the serverless backup system with the size of the designated data in the source storage object; and, if the size of the data in the source storage object is greater than the base memory buffer size, generating a plurality of pseudo-instructions corresponding to a plurality of data portions, each of the data portions having a size less than or equal to the base memory buffer size; thereby allowing instructions designating a transfer of data of any size to be processed by the serverless backup system. Another aspect includes the additional step of executing each of the pseudo-instructions.

In another aspect of the invention, the serverless backup system includes a host; one or more physical storage devices; a source storage object having a data portion; a destination storage object; and means for determining a desired manner to process a transfer of data from the source storage object to the destination storage object. In another aspect, the serverless backup system includes a compiler. In yet another aspect, the serverless backup system includes a run-time engine.

In another aspect of this invention, the serverless backup system includes means for generating a list of input/output actions to be processed by said serverless backup system. In yet another aspect, the system includes means for determining the manner of execution of the input/output actions as a function of characteristics of the instructions and the physical storage devices present in the serverless backup system.

In another aspect of the present invention, the serverless backup system includes means for processing a data portion or segment of any size. In another aspect, the system includes means for generating pseudo-instructions.

The general object of the invention is to improve the efficiency of data transfers in a serverless backup, or third party copy, system.

Another object of the present invention is to insure the integrity of such a transfer.

Another object of this invention is to provide the host associated with a serverless backup system with the status of processing or executing an EXTENDED COPY command.

Yet another object of the present invention is to quicken the process of transferring data to physical or virtual storage devices, and retrieving data from such devices.

Other objects include increasing the efficiency of a copy manager in a serverless backup system, and improving the efficiency of physical storage devices.

These and other objects and advantages will become apparent from the foregoing and ongoing written specification, the accompanying drawings and the appended claims.

BRIEF DESCRIPTION OF THE DRAWINGS

FIG. 4 is a flowchart illustrating an embodiment of the method of the present invention.

DESCRIPTION OF THE PREFERRED EMBODIMENTS

Figure 1:
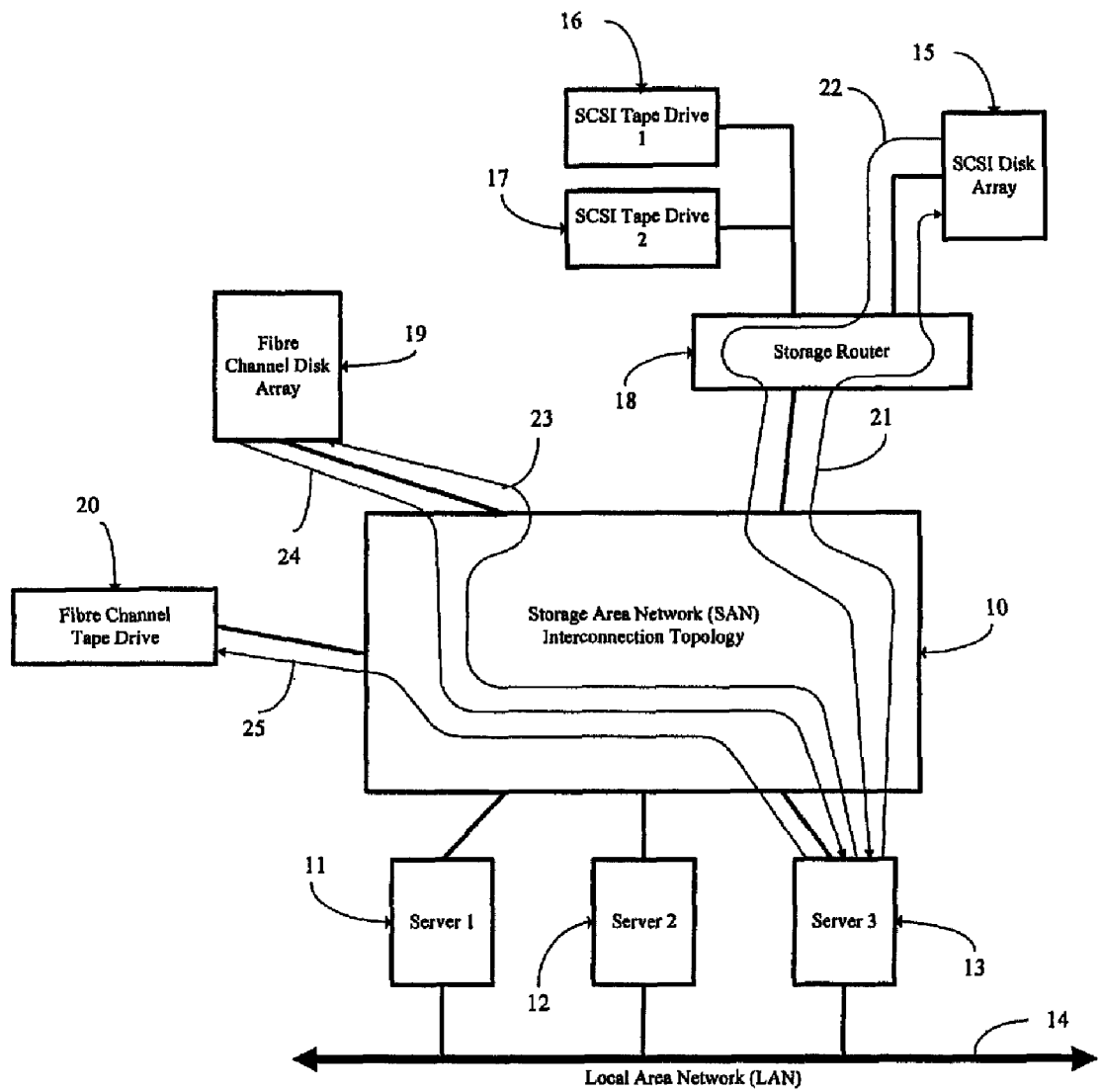
FIG. 1 is a block diagram depicting a LAN free backup system.
Figure 2:
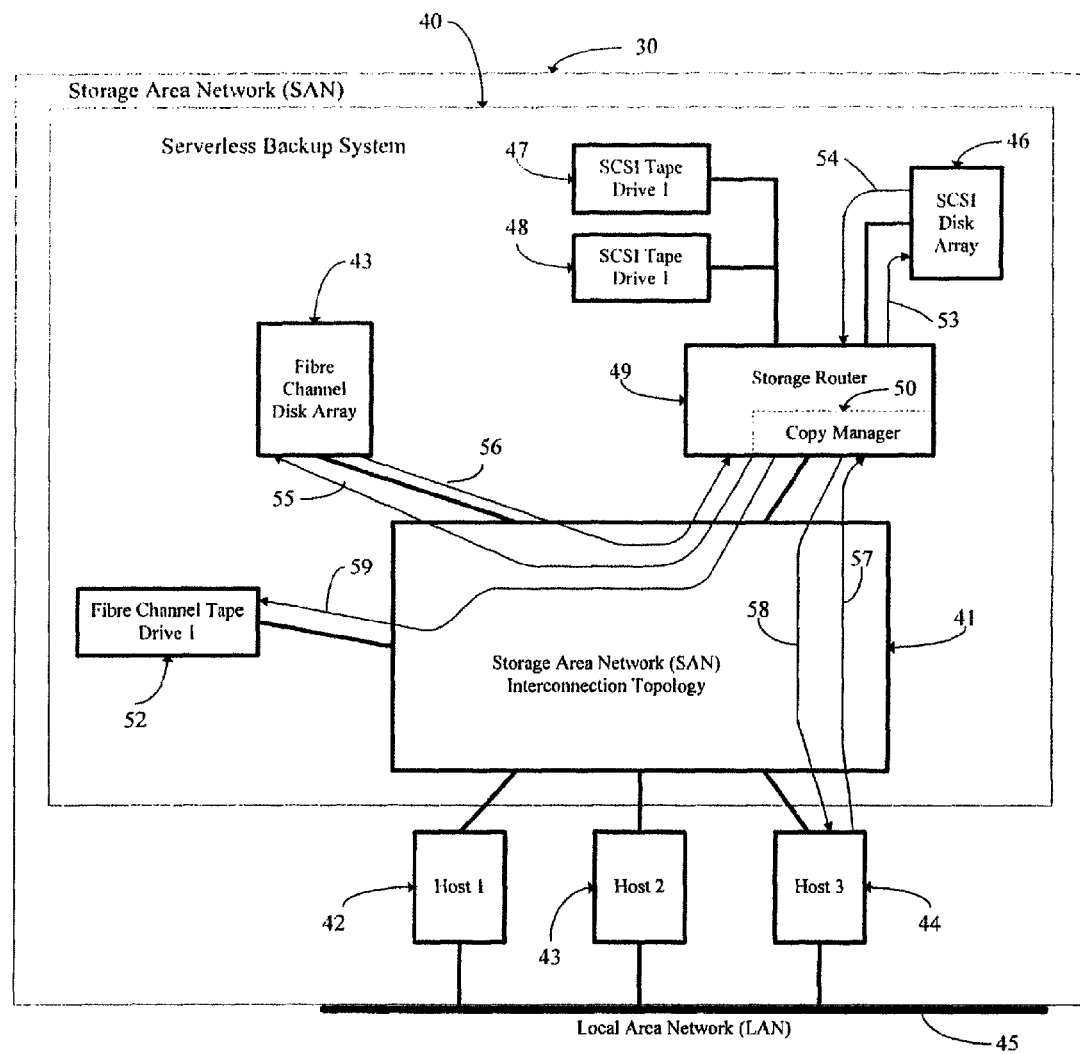
FIG. 2 is a block diagram illustrating a serverless backup system in a storage area network, associated with hosts.
Figure 3:
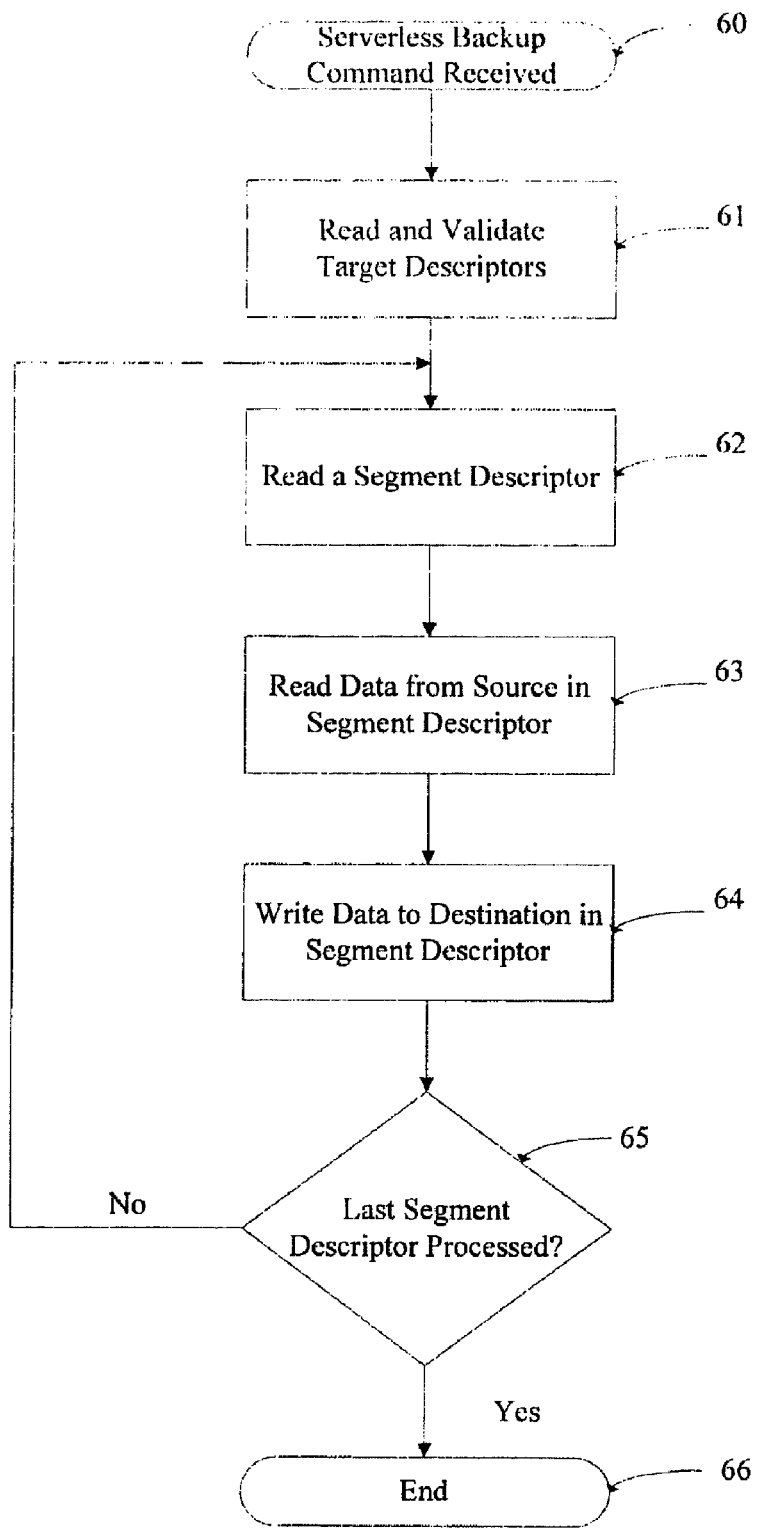
FIG. 3 is a flowchart illustrating the processing of serverless backup commands in the prior art.

At the outset, it should be clearly understood that like reference numerals are intended to identify the same parts, elements or portions consistently throughout the several drawing figures, as such parts, elements or portions may be further described or explained by the entire written specification, of which this detailed description is an integral part. Unless otherwise indicated, the drawings are intended to be read together with the specification, and are to be considered a portion of the entire written description of this invention.

FIG. 4 is a flow chart depicting one illustrative embodiment of the invention. The method illustrated in FIG. 4 strives to improve the efficiency of data transfer associated with a serverless backup command, and to maximize the utilization and performance of physical storage devices involved in data backup, while ensuring the integrity of the data transfer.

The process starts with the transfer of a serverless backup command, i.e. an EXTENDED COPY command, from a host to the serverless backup system, shown in block 70 as receipt by the serverless backup system of a serverless backup command. Next, at block 71, the target descriptors associated with the command are validated. In this embodiment, this validation is performed by comparing the list of target descriptors with those target descriptors supported by the copy manager. In this regard, a copy manager may not support all specification-defined target descriptors. The host, therefore, inquires the supported target descriptors before generating a serverless backup command. Additionally, at block 71, the copy manager residing in the serverless backup system verifies that the format of the supported target descriptors is compliant with the serverless backup specification in use, e.g. T10 and SPC-3. If unsupported or non-compliant target descriptors are located 72, the method proceeds to blocks 94 and 95, wherein the serverless backup command is terminated, an error message is generated and status is returned to the host.

If a determination is made that the target descriptors are valid 72, the copy manager, at block 73, instantiates all storage devices, both physical and virtual, associated with the command. This step verifies that storage devices utilized by more than a single instance of a serverless backup command are properly referenced during processing. This step also enables physical and virtual storage devices to be treated in the same manner while processing a serverless backup command. Finally, this step 73 provides a means for the copy manager to verify that the maximum allowable number of targets associated with a command has not been exceeded. Should any errors be encountered while instantiating storage devices, the method proceeds to blocks 94 and 95, wherein the serverless backup command is terminated, an error message is generated and status is returned to the host.

If the system is able to instantiate all storage devices 74, the method proceeds to block 75, where the segment descriptors, or instructions, associated with the serverless backup command are validated. In this embodiment, this validation is performed by comparing the list of segment descriptors to be processed with the segment descriptors supported by the copy manager, i.e. a predetermined set of instructions executable by the serverless backup system. The copy manager may not support all specification-defined segment descriptors. The host, therefore, inquires the supported segment descriptors before generating a serverless backup command. Additionally, the copy manager verifies that the format of the supported target descriptors is compliant with the serverless backup specification in use. This allows the copy manager to compare the desired data transfer instructions with the predetermined set of instructions that it has been designed to support. If it is determined that unsupported or non-compliant segment descriptors are present 76, the method proceeds to blocks 94 and 95, wherein the serverless backup command is terminated, an error message is generated and status is returned to the host.

Figure 5:
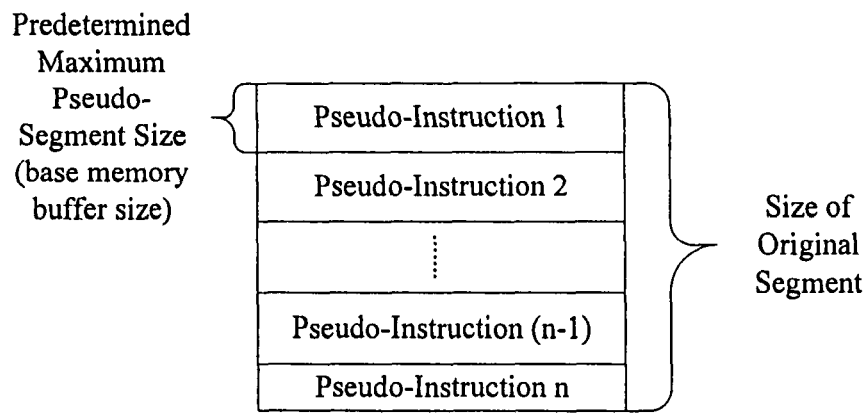
FIG. 5 illustrates the pseudo-instructions of the present invention.

If not 76, the method proceeds to block 77, wherein a pseudo-instruction, or pseudo-segment, analysis is performed. In the course of processing segments or instructions, the possibility exists that the amount of data designated to be moved by an instruction is larger than the physical memory available in the copy manager. Based upon the complete individual processing of segment descriptor model of execution in prior art, it is common for copy managers to limit the maximum segment size to a number of bytes smaller than the physical memory in the copy manager. This places constraints on backup software that utilizes the copy manager by forcing it to generate longer serverless backup commands which move smaller amounts of data per segment descriptor. The methods of this invention enhance serverless backup performance by allowing for segments of unlimited size. In the process of compiling individual segments, segments larger than a predetermined size, i.e. the base memory buffer size, are broken into smaller segment descriptors termed pseudo-segments or pseudo-instructions 77. These pseudo-instructions are then compiled, at blocks 78 through 82, as if the original serverless backup command had contained such multiple instructions. The number of pseudo-instructions created equals the total data transfer called for in the original instruction divided by the base memory buffer size, with that quotient rounded up. An example of a segment descriptor being broken into pseudo-instructions is shown in FIG. 5. In this illustrative embodiment, the predetermined size of pseudo-instructions can be tailored to maximize data transfer performance based upon several factors including the size of the physical memory in the copy manager, and the characteristics of the physical storage devices present in the system and associated with the serverless backup command.

Upon successful completion of segment descriptor validation 76, the method passes to a multi-pass compiler 78, 79, 80, 81, 82. The compilation of this embodiment is both iterative and cumulative in nature, with the final result being a data transfer sequence optimized or improved to take advantage of the particular capabilities of the copy manager and the storage devices involved in the serverless backup. The first aspect of the compilation phase involves the parsing of individual segment descriptors into input 78 and output 79 actions corresponding to all data transfers described by the instruction, i.e. generating input/output actions. The number of input/output actions created will vary based upon the nature of the instruction being parsed, as well as that of the previous instruction(s), and the characteristics of the physical storage devices involved in the current segment.

Once the input/output actions have been created, they are optimized 80, 82 to improve the performance of the serverless backup system, i.e. a desired manner of execution of the input/output actions is determined as a function of the characteristics of the instructions, e.g. data location, transfer size, device identifiers. The final result of the optimization is a more efficient order of data movement than that originally specified in the segment descriptors. This method creates input/output action lists, and the corresponding improved order of data transfers based upon an analysis of several factors: the characteristics of the physical storage devices involved in the segment, and the characteristics of the segment descriptor itself. Specific factors considered in this embodiment include the identity of the applicable device in the serverless backup system, physical storage devices, the access nature of the device, whether or not the device accepts commands which are tagged in nature, if the device is part of a striped array, the size of the data transfer to the physical device, and the location of data on the physical device.

After optimizing the action items for one instruction, the next instruction is selected 81 and the process of parsing and optimizing described above 78, 79, 80 is repeated 81. The segment compiling continues in this iterative fashion until all segment descriptors have been processed.

Upon the completion of the iterative compilation of the final segment descriptor, the cumulative facet of the compiler takes effect. At this point all of the input/output actions generated for the command are optimized collectively in a single final pass 82 of the input and output action lists. Criteria similar to that used in the optimizing of actions associated with individual segments are used in this final, cumulative optimization.

The final phase of operation involves the actual movement of data within the serverless backup system. Upon completion of the final optimization 82, the input/output action lists are passed to a run-time engine 83 for processing and evaluation. In this embodiment of the invention, the run-time engine generates and manages the actual data transfer commands which will process the backup. The run-time engine generates and manages storage protocol commands required to direct the flow of data from the source storage objects to the destination storage objects in the serverless backup system. These storage protocol commands take the form of the native protocol for the device referenced. The result may be SCSI, FCP, iSCSI, or ATA commands, to name some examples. The actual issuing sequence of storage protocol commands occurs based upon the order of the actions as a result of the compilation process, and the conformance of individual actions to a devised system of firing rules. The firing rules stipulate when a command can be issued to a storage device. These rules take into account the presence of data within the copy manager to complete the command to be issued, as well as any data hazards conditions that may apply to the action. Data hazards for actions are defined exactly as they are for pipelined execution in computer architecture analysis. If the firing rules for an action are satisfied when the action is evaluated, the actual data transfer associated with that action may begin. In evaluating firing rules and the status of physical storage devices involved in the backup, the run-time engine oversees all of the data transfers called for in the original serverless backup command.

The run time engine completes when all actions and their corresponding data transfers have completed successfully or an error is encountered in command processing by one of the storage devices. In the case of such an error an appropriate failure message is prepared and sent back to the host.

These steps are illustrated in FIG. 4. After the input/output actions are passed to the run-time engine 83, a determination is made whether any storage device has reported an error 84. If any storage device has reported an error, the method passes to blocks 94 and 95, wherein the command is terminated, an error message is generated, and command status is returned to the host.

If no storage device has reported an error, a determination is made whether all input actions have been processed 85. If all input actions have been processed, the method passes to block 89, where a determination is made whether the firing rules have been met for the output actions. If not, the method passes back to block 84. If the firing rules have been met, a determination is made whether the designated output device can accept a command 90. If not, the method passes back to block 84. If the output can accept a command, an output command is issued to write data 91.

If, at block 85, a determination is made that all input actions have not been processed, the method passes to block 86 where a determination is made as to whether the firing rules have been met for the next input action. If not, the method passes to block 89, and the procedure described above with respect to block 89 is followed.

If, at block 86, a determination is made that the firing rules have been met for the next input action, the method passes to block 87, where a determination is made as to whether the designated input device can accept the command. If not, the method passes to block 89, and the procedure described above with respect to block 89 is followed.

If, at block 87, a determination is made that the designated input device can accept the command, an input command is issued to read data 88.

If the foregoing method results in the issuance of an output command to write data 91, the method then passes to block 92, where a determination is made whether a storage device has reported an error. If it has, the method passes to blocks 94 and 95, wherein the command is terminated, an error message is generated, and command status is returned to the host.

If a determination is made that no storage device has reported an error, the method passes to block 93, where a determination is made as to whether all output actions have been processed. If not, the method passes to block 84, and the foregoing method repeats. When all output actions have been processed, the method passes to block 95, where the command status is reported to the host.

While there has been described what is believed to be the preferred embodiment of the present invention, those skilled in the art will recognize that other and further changes and modifications may be made thereto without departing from the spirit of the invention. Therefore, the invention is not limited to the specific details and representative embodiments shown and described herein. Accordingly, various modifications may be made without departing from the spirit or scope of the general inventive concept as defined and differentiated by the following claims.

What is claimed is:

1. A method of executing a command comprising one or more segment descriptors designating the transfer of data from at least one source storage object to at least one destination storage object, in a serverless backup system having at least one physical storage device and a base memory buffer size, and being associated with a host and a data mover, comprising the steps of:
   transferring from said host to said data mover a command comprising a segment descriptor, said segment descriptor designating a transfer of data in a source storage object;
   comparing said base memory buffer size with the size of said data in said source storage object;
   generating a plurality of pseudo-segments in said data mover corresponding to a plurality of data portions, each of said data portions having a size less than or equal to said base memory buffer size, if said size of said data in said source storage object is greater than said base memory buffer size; and
   transferring said data in said source storage object in accordance with said pseudo-segments;
   thereby allowing segment descriptors designating a transfer of data of any size to be processed by said serverless backup system.

2. The method of claim 1 wherein said command is an EXTENDED COPY command.

* * * * *